T. G. Hall,
Grain Drill.
No. 85,524. Patented Jan. 5, 1869.
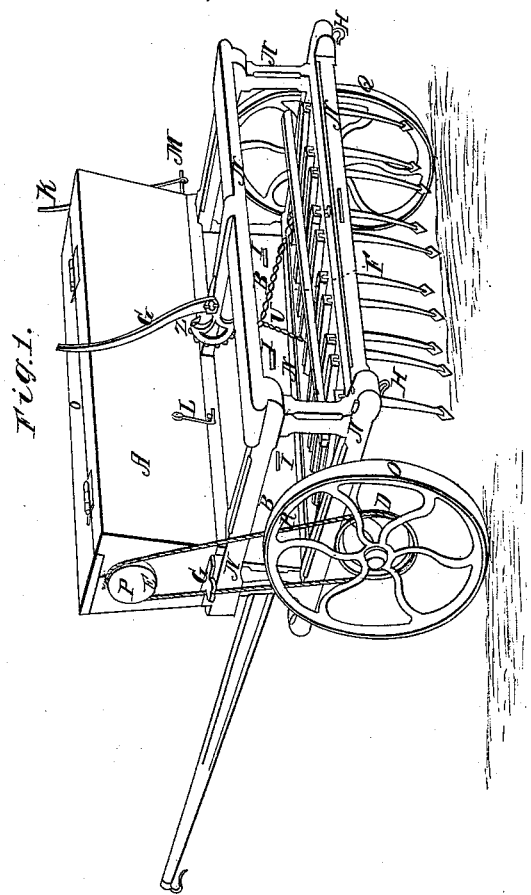
Fig. 1.
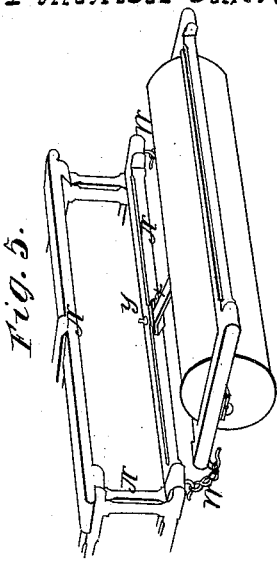
Fig. 5.
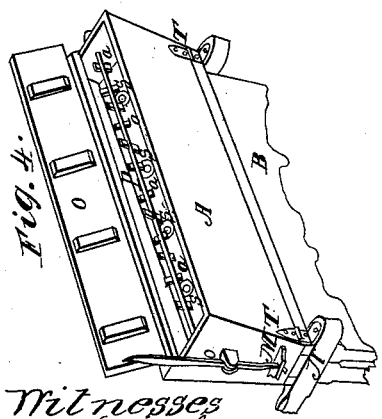
Fig. 4.
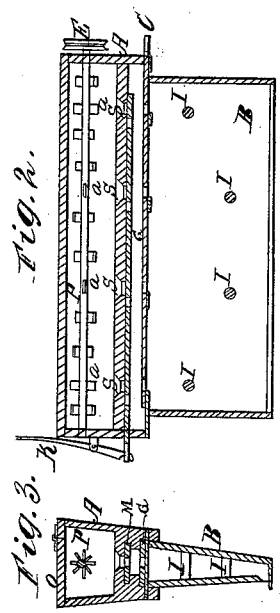
Fig. 2.
Fig. 3.
Witnesses
Geo. D. Cowles
H. Hoyt
Inventor
T. G. Hall

United States Patent Office.

THURSTON G. HALL, OF HUME, NEW YORK.

*Letters Patent No. 85,524, dated January 5, 1869.*

IMPROVEMENT IN SEED-SOWERS.

The Schedule referred to in these Letters Patent and making part of the same.

*To all whom it may concern:*

Be it known that I, THURSTON G. HALL, of the town of Hume, in the county of Allegany, and State of New York, have invented a new and useful Machine for Sowing Broadcast all Kinds of Grain-Seeds and Fertilizers, which I have entitled "Hall's Broadcast-Seeder;" and I do hereby declare that the following is a full, clear, and exact description of the construction and operation of the same, reference being had to the annexed drawings, and the letters of reference marked thereon, making a part of this specification, in which—

Figure 1 is a perspective view of the entire machine;

Figure 2, a longitudinal section of the same through the hopper, slides, and grain-distributer;

Figure 3, a transverse section of the same parts;

Figure 4, a perspective of the hopper from the front, with the cover raised to show the construction and situation of the agitator; and Figure 5, a view of the extreme rear of the machine, and the method of attaching any ordinary roller thereto.

To enable others skilled in the art to make and use my invention, I will now describe its construction and operation.

I construct a substantial frame, of wood, or other suitable materials, of any desired dimensions, marked N, in fig. 1, which I mount upon two wheels, having a broad face, and of any required diameter.

These wheels turn upon axles, fastened to the frame in any convenient manner, except that one of these wheels (in the drawing, the near one,) is placed sufficiently far away from the end of the frame to allow room for a pulley, which I cast upon or attach to the inside of the spokes of that wheel, and which is marked D, in fig. 1, and is intended to carry the band marked R, fig. 1.

I construct a hopper, marked A, fig. 1, of wood, or any suitable material, of the same length as the frame N, and of a width sufficient to hold the desired quantity of grain or seed for sowing one or more acres.

I construct this hopper narrower at the bottom than at the top, of any convenient height, with a flat bottom, having in it four or more holes at equal distances apart in the direction of its length, and large enough to discharge the greatest quantity of grain ever required to sow an acre of ground.

These holes are marked S in figs. 2 and 4.

I close these holes in the bottom of the hopper by a slide, constructed of wood or metal, having in it corresponding holes, moving close against the bottom of the hopper, marked M in fig. 2, and operated by a lever, marked K, fig. 2, so situated as to be easily accessible to the driver when seated on the top of the hopper.

The object of this slide is to prevent the discharge of grain and seed when the machine is not in operation.

Immediately beneath this slide M, fig. 2, I place a second slide, constructed of wood or metal, marked G, fig. 2, having in it holes corresponding, in number, size, and situation, with those in the bottom of the hopper, which I operate by the hand and fasten in the required place by a set-screw or other convenient device.

The object of this slide G is to regulate the discharge from the hopper, at pleasure, according to the amount of grain, seed, or fertilizer desired to be sown upon an acre, by reducing the size of the discharge-holes in the bottom of the hopper.

Lengthwise through the centre of the hopper, I place a shaft, of wood or iron, having its bearings in the ends of the hopper at or a little above the middle thereof, marked P in figs. 2 and 4.

Through this shaft I insert arms or paddles, at the points therein directly over the holes in the bottom of the hopper, and of a length sufficient to suitably agitate the grain in the hopper when the shaft is in motion, marked *a a* in fig. 2.

I attach this hopper to the front part of the frame N, fig. 1, by hinges marked T, fig. 4, and secure it in place by the hook marked L, fig. 1.

The top of this hopper I close with a lid, marked O, fig. 1.

I extend one end of the shaft of the agitator, marked P, fig. 2, through the end of the hopper far enough to receive a pulley, marked E, fig. 1, over which I pass the band R, fig. 1, from the pulley D upon the wheel Q, fig. 1, by which the agitator is operated when the machine is in motion.

Immediately beneath the hopper, when in position upon the front part of the frame, as shown in fig. 1, I place the grain-distributer, marked B, which I construct of wood or other material, of as great a length as will go between the end-pieces of the frame N, fig. 1, and of a width at the top about equal to that of the bottom of the hopper, and somewhat narrower at the bottom, and of a depth sufficient to reach down to or a little below the bottom of the frame N, fig. 1, to which I fasten it firmly by screws, or in any other suitable manner.

The bottom of this distributer I slant downward from the back towards the front, and firmly secure it at its back and ends to the body of the distributer, leaving a small space between the bottom and front of the distributer, marked V, fig. 3, to let the grain pass readily out of the distributer, in front thereof, upon the ground.

Through this distributer, and vertically under the discharge-holes in the bottom of the hopper, when in position, and at varying distances from the bottom of the hopper, I place cross-bars, of such number, shape, and size as may be necessary to evenly distribute the grain discharged by the hopper into the distributer, which are marked I I in figs. 2 and 3.

To that one of the longitudinal bars of the frame immediately back of the distributer B, fig. 1, I attach a cultivator, of any convenient form, by a hinge-joint, or other equivalent arrangement, which will permit it to be raised or lowered at will, as shown by F, fig. 1.

I raise or lower this cultivator at pleasure by means of the lever marked C, fig. 1, which I attach in any suitable manner to one of the cross-pieces of the frame, in such place as to always bring the handle of the lever within easy reach of the driver when seated on the hopper.

The short arm of this lever I construct in the form of a cam, of sufficient thickness to allow of a groove in its edge to receive the chain marked U, fig. 1, one end of which is secured to the frame of the cultivator in any ordinary manner, and the other to the upper corner of the cam-arm of the lever, as shown at z, fig. 1.

The side of the cam-arm of this lever, and that one next the cross-bar of the frame to which the lever is secured, I construct in the form of a ratchet catching into a piece of metal fastened to the upper side of the same cross-bar, by which the lever and cultivator are retained at any height desired.

To the centre of the rear longitudinal bar of the frame N, fig. 5, I attach any ordinary farm-roller by means of a coupling-bar, marked x, fig. 5, one end of which enters a slot in the rear bar of the frame, and is retained in place by the pin marked y, fig. 5, and the other end of which is secured to the frame of the roller in like manner.

I also further attach the roller to the frame N, fig. 5, by two chains, of suitable length, fastened to and leading from the rear part of the lower-end cross-bars of the frame N, fig. 5, to hooks attached to the front part of the end-bars of the roller-frame shown at w, fig. 5.

Having described the construction of my invention, I now proceed to the manner of its operation.

With all the parts of the machine in position, as shown in fig. 1, I set the lower slide of the hopper, marked G, at the point required, to make the discharge-holes in the bottom of the hopper of the proper size to sow the desired quantity of grain, wheat, for instance, upon an acre, and fasten it securely in place by a set-screw, and then fill up the hopper A with wheat, observing that the discharge-holes in the bottom thereof are closed by the slide M, operated by the lever K. I then take my seat upon the hopper, at that point where I can most easily reach the handles of the two levers K and C, and proceed to the field to be sown. I then lower the cultivator-teeth to the desired point by throwing back the lever C, and open the discharge-holes in the bottom of the hopper by throwing back the lever K, the operation of which is more readily seen in fig. 2, and commence by driving around the field, keeping that wheel to which the pulley D is attached nearest the centre of the field, and so continue until the entire field is sown.

As soon as the machine commences to sow, the wheat runs through the discharge-holes in the bottom of the hopper, as regulated in size by the slide G, and falls upon the cross-bars, vertically underneath them, into the distributer B, as shown in fig. 2, by which it is scattered very evenly over the entire bottom of the distributer, from which it falls upon the ground with a bound in front of the teeth of the cultivator, through the opening at the bottom front edge of the distributer shown at V, fig. 3.

The grain is prevented from clogging up the discharge-holes in the bottom of the hopper by the rotation of the agitator P, fig. 3, operated by the band R and pulley D, fig. 1, so that the hopper discharges the grain, seed, or fertilizer to be sown continuously and with the desired rapidity.

I do not claim as my invention the frame and wheels, the cultivator, or the roller, either separately or in combination; but What I do claim as my invention, and desire to secure by Letters Patent, is—

1. The slides M and G, in combination with the distributer B, constructed and arranged substantially as above set forth.

2. The distributer B, constructed with the cross-bars I, the slanting bottom and discharge-slot V, or their equivalents, substantially as and for the purposes above described.

3. The combination of the hopper A and distributer B, constructed and arranged substantially as and for the purposes as above described.

4. The method of attaching the roller to the frame of the machine by means of the coupling-bar x and chains w, arranged substantially as above described, in combination with the hopper A and distributer B, as and for the purposes above described.

T. G. HALL.

Witnesses:
GEO. D. COWLES.
H. HOYT.